United States Patent [19]

Shachat et al.

[11] Patent Number: 4,950,492

[45] Date of Patent: Aug. 21, 1990

[54] PROCESS FOR MAKING MICROWAVE PUFFED SNACK PRODUCTS

[76] Inventors: Mimi A. Shachat, Rte. 1, Box 219, Riegelsville, Pa. 18077; Sally J. Raphael, 315 East 72nd St., New York, N.Y. 10021

[21] Appl. No.: 415,892

[22] Filed: Oct. 2, 1989

[51] Int. Cl.5 .......................... A21D 6/00; A23L 1/00
[52] U.S. Cl. .................................... 426/243; 426/446; 426/510; 426/559; 426/808
[58] Field of Search ............... 426/243, 446, 458, 559, 426/808, 510, 511

[56] References Cited

U.S. PATENT DOCUMENTS 3,719,501  3/1973  Rispoli et al. ................. 426/808
3,925,567  12/1975  Abe .............................. 426/559

Primary Examiner—George Yeung
Attorney, Agent, or Firm—John Lezdey

[57] ABSTRACT

A process for preparing a puffed flavored food snack without the use of fats and oils comprising the steps of forming a flour free starch dough with at least 20% by weight of tapioca starch. The dough is then steamed until translucent, cut into discrete pieces and cooked in a microwave oven.

15 Claims, No Drawings

PROCESS FOR MAKING MICROWAVE PUFFED SNACK PRODUCTS

FIELD OF THE INVENTION

The present invention relates to a process for making microwave puffed or expanded snack products without the use of fats and/or oils. More particularly, the invention provides a snack product prepared from starch which has been puffed by means of microwaves.

BACKGROUND OF THE INVENTION

It is known that certain farinaceous materials can be prepared into flavored puffed snacks by simply heating such materials in a conventional consumer microwave oven or deep-fat frying. While such puffed, deep-fat fried snacks are popular, they are not without disadvantage. Deep-fat fried snacks typically have high fat levels which can reach as high as 35% by weight. Such high levels render the snacks high in calories and also limits the shelf life.

U.S. Pat. No. 4,251,551 discloses a cheese coated product which has been puffed using microwaves which utilizes an edible fatty triglycerides to aid in expanding the product. The product which is a puffed is derived from a gelatinized starch-containing dough.

U.S. Pat. No. 3,966,990 discloses a microwave puffable dough which comprises an alcohol washed, granular hydroxypropyl starch derivative obtained from hydrolyzed starch. The starch utilized is pretreated with anhydrous disodium phosphate and reacted With propylene oxide.

European Patent No. EP 0113 940A1 discloses a cheese and onion flavored crisp which is made by heating to foaming in a microwave oven a smooth paste of dried skim milk, cheese and onion flavored powder and water to produce a product with a foamed texture. The product is then cut to shape and dried to less than 5% moisture.

Farinaceous dough products which result in a puffed product which are visually attractive, and can be prepared with high puff success rates on a commercial scale are desirable. In addition, many consumers desire food products which are free of any chemicals or additives having a high cholesterol level, such as coconut oil, which are used to improve puffing.

Cheese flavored puffed snacks are also well known. Such coated products are typically prepared by first forming a puffed product and, thereafter, as a separate step, combining the previously puffed product with a coating usually with simultaneous tumbling and heating. While such complex and inconvenient methods may be commercially practical to provide cheese-coated puffed snacks, such methods of providing cheese flavored puffed snacks are not practical or are at least inconvenient for a large scale preparation of cheese flavored puffed snacks. Thus, it would be desirable to be able to prepare a cheese flavored puffed snack conveniently by simply heating such as in a conventional consumer microwave oven whenever desired.

Accordingly, it is an object of the invention to provide a flavored puffed shack product which does not have any chemical additive and can be prepared in a conventional microwave oven.

It is further object of the invention to provide a flavorful puffed snack product which has a high rate of success in puffing.

It is still further object of the invention to provide a cheese flavored puffed snack product which is flavorful and inexpensive.

It is another object of the invention to provide a process for preparing a flavorful snack product which has been prepared without utilizing chemical additives.

SUMMARY OF THE INVENTION

The present invention relates to a food composition which upon microwave heating yields a flavored puffed snack, and the process for its preparation. More particularly, the invention provides a process for preparing a novel all-natural puffed snack product from a starch dough containing a flavoring agent. According to the process, a tapioca based starch dough is generally prepared with about 10 to 40% by weight, preferably about 10 to 20% by weight of a flavoring agent. The dough is then shaped into a log or any desired geometric form of individual or discreet puffable pieces, for example, about 1 in. × ¾ in. × 1/16 in. pieces. The log or pieces are then placed onto a screen or apertured holding pan or rack and heated over steam. The log or pieces are steamed until they become translucent. The steaming time is usually about 30 hour. The time will vary on the size of the log or pieces and the type of starch utilized.

The steaming step is a critical part of the process. It has been found that if the pieces of dough were boiled instead of steamed, the product was tacky and did not provide an attractive product when microwaved.

The steamed product is then placed in a microwave oven and cooked until the pieces puff and the desired crispness is obtained.

The type or starch utilized to prepare the dough is also critical for the invention. The dough must be comprised of tapioca starch or a mixture of tapioca starch with other starches. Preferred other starches include potato starch and corn starch. The tapioca starch content of the dough should be at least 20% by weight.

The addition of flour has been found to reduce the degree of expansion of the steamed dough during microwave cooking.

Preferred flavoring agents include dehydrated cheese, cheese and garlic or onions, milk products, shrimp flavoring, and the like.

The preferred flavoring is dehydrated cheese solids. Dehydrated cheese solids are generally prepared by comminuting the desired type of cheese and then forming a 40% solids slurry by diluting the comminuted cheese, an emulsifier and other flavoring agents are added and the mixture with or without homogenization is heated to a pasteurizing temperature. Thereafter the mixture is spray dried. More details for preparing dehydrated cheese solids are given, for example, in "Food Dehydration", Ed. by Van Arsdel et al (2nd Edition 1973), Vol. 2, p 334, which is herewith incorporated by reference. Suitable cheeses include blue cheese, brick, cheddar, colby, provolone, parmesan and the like.

In one method of preparing the puffable dough pieces, the dough is formed with the flavoring agent. The dough is then placed into an extruder and formed into logs.

The logs are steamed, refrigerated and then frozen. The frozen logs can then be cut into suitable discreet pieces to be microwaved.

DESCRIPTION OF THE PREFERRED EMBODIMENTS

The present invention relates to food compositions which upon simple microwave heating gradually form puffed, crisp flavored snacks, and the method for their preparation. The present composition is essentially prepared by admixing a starch dough which is comprised of at least 20% by weight of tapioca starch and a dehydrated flavoring agent. The starch dough may comprise entirely tapioca starch but it has been found that mixture with at least one other starch has produced a more flavorful snack product. Other suitable starches include corn starch and potato starch. A starch dough comprising as the starch ingredients 20–40% tapioca starch, 20–40% potato starch, and 20–40% corn starch preferably, in equal amounts has been found to yield an excellent puffable product.

A dehydrated flavoring agent comprising about 10 to 40% by weight of the dough, preferably 10–20% is mixed into the dough. The dough is then formed into logs or discreet pieces. The logs or pieces are arranged on an open rack and placed over a source of steam. The dough logs or pieces are steamed until they become translucent, approximately 30 minutes to 1 hour. The steamed dough in the form of logs are then cooled and refrigerated 3–5 days. The logs are then frozen and cut to size. The dough pieces can be placed on the bottom of a microwave proof container and heated until the pieces slowly expand into puffed products having volumes several times that of the unheated product. Upon cooling, the puffed snack food products are crisp and light and have a desired flavor.

In accordance with a preferred embodiment of the invention, a dry mix of about 20–40% by weight tapioca starch, about 40–60% by weight of a mixture of corn starch and potato starch and 10 to 20% by weight of dehydrated cheese is formed into a dough with about 10 to 15% water. The dough is then extruded either into logs or pieces. The extruded dough is then steamed until the pieces or logs are translucent. The steaming time is about 30 minutes to 1 hour. The pieces after steaming may be microwaved at high for about 1–2 minutes depending upon size of the pieces.

The logs of steamed dough are preferably refrigerated at about 40–50 F. for about 3–5 days. The logs are then frozen to facilitate slicing. The sliced pieces may then be cooked by microwaves.

The present invention will be illustrated in detail by the following Examples wherein percent and parts are by weight unless otherwise indicated.

EXAMPLE 1

A food composition of the present invention is prepared as follows:

| Ingredient | Parts by weight |
| --- | --- |
| Tapioca starch | 3 |
| Potato starch | 3 |
| Corn starch | 3 |
| Dehydrated cheese | 1 |
| Flavoring & coloring | 0.1 |
| Water | 0.5 |

The dry ingredients are thoroughly mixed in a Hobart mixer until a uniform blend is obtained. The water is then added to obtain a dough. The dough is then placed into an extruder and extruded into one foot long cylindrical strips about ¾" in diameter onto a rack. The rack is then placed over steam jets where the logs are steamed for about an hour until they become translucent. The logs are then refrigerated for 3–5 days at 45 F. and then placed into a freezer for one day. The frozen logs are then cut into one inch pieces and placed into a microwave power for 1–2 minutes. The product is expanded and ready for consumption.

EXAMPLE 2

Following the procedure of Example 1, a series of different doughs were prepared and heated in a microwave oven.

| Dough Ingredient | Amount % weight |
| --- | --- |
| A. Tapioca starch | 35 |
| Corn starch | 35 |
| Dehydrated cheddar cheese | 20 |
| Moisture | 10 |
| B. Tapioca starch | 70 |
| Dehydrated cheddar cheese | 20 |
| Moisture | 10 |
| C. Potato starch | 35 |
| Corn starch | 35 |
| Dehydrated cheddar cheese | 20 |
| Moisture | 10 |
| D. Rice starch | 70 |
| Dehydrated cheddar cheese | 20 |
| Moisture | 10 |
| E. Mixing bean starch | 70 |
| Dehydrated cheddar cheese | 20 |
| Moisture | 10 |
| F. Tapioca starch | 30 |
| Potato starch | 15 |
| Corn starch | 15 |
| All purpose white flour | 10 |
| Dehydrated cheddar cheese | 20 |
| Moisture | 10 |

Results

Samples A and B were the only samples which expanded to more than three times their original size. Sample F expanded one time its original size and had the feel of a cookie.

Samples C, D and F were similar to a cracker.

What is claimed is:

1. A process for preparing a puffed flavored food snack without the use of fats and/or oils comprising the steps of:
   A. forming a flour-free dough with a dry mix of starches comprising at least 20% by weight of tapioca starch, about 10–40% by weight of a flavoring agent and water;
   B. steaming said dough from part A until the dough is translucent, and then
   C. cooking the dough from part B with microwaves.

2. The process of claim 1 wherein said dough of part A comprises three different starches of equal amount.

3. The process of claim 2 wherein said starches are tapioca, potato and corn starch.

4. The process of claim 1 wherein said flavoring comprises dehydrated cheese.

5. The process of claim 4 wherein said dehydrated cheese comprises 10 to 20% by weight of the dry mix.

6. The process of claim 1 wherein the steamed dough is refrigerated, frozen and then cut into geometric pieces.

7. The process of claim 1 wherein the dough of part A is cut into discrete geometric pieces prior to steaming.

8. A process for preparing a cheese flavored puffed food snack without the use of fats and/or oils comprising the steps of:
  A. forming a flour-free dough with a dry mix of about 20 to 40% by weight tapioca starch, about 40 to 60% by weight, of a mixture of corn starch and potato starch, about 10 to 20% by weight of dehydrated cheese flavoring, and water;
  B. forming the dough from part A into discrete pieces;
  C. steaming the dough of part B until the dough is translucent, and
  D. subjecting the steamed dough to microwaves until expanded.

9. A puffed flavored food product prepared by the process of claim 1.

10. The puffed flavored food product prepared by the process of claim 2.

11. The puffed flavored food product prepared by the process of claim 3.

12. The puffed flavored food product prepared by the process of claim 4.

13. The puffed flavored food product prepared by the process of claim 5.

14. The puffed flavored food product prepared by the process of claim 6.

15. The puffed flavored food product prepared by the process of claim 8.

* * * * *